United States Patent Office 3,475,121
Patented Oct. 28, 1969

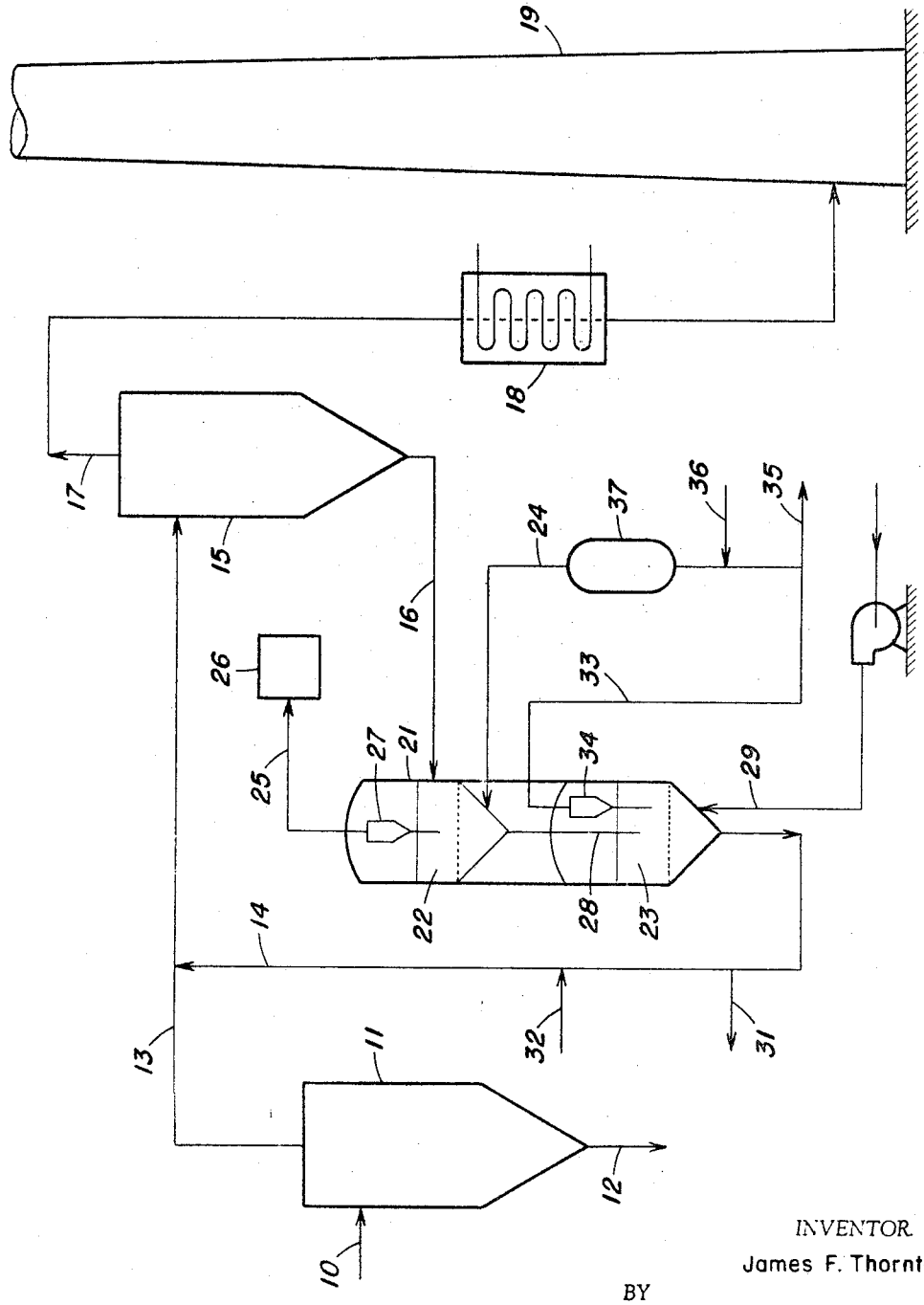

3,475,121
PROCESS FOR ABSORBING SO₂ FROM GASES WITH ALKALINE EARTH METAL OXIDES
James F. Thornton, New York, N.Y., assignor to The Lummus Company, New York, N.Y., a corporation of Delaware
Filed Nov. 16, 1966, Ser. No. 594,837
Int. Cl. C01b 17/62, 17/48
U.S. Cl. 23—178                         4 Claims

ABSTRACT OF THE DISCLOSURE

Process for absorbing sulfur dioxide from a gas by introducing a finely divided alkaline earth metal oxide into the gas whereby the sulfur dioxide reacts therewith to produce the corresponding sulfite. The sulfite is separated from the gas, decomposed in a fluidized state to recover sulfur dioxide and the metal oxide and the metal oxide cooled for recycling to the absorption step.

---

This invention is directed to a process for cleaning stack gases and more particularly to a process for removing sulfur compounds from a stack gas.

In the burning of industrial fuels, for example in a boiler, the products of combustion include undesirable sulfur compounds, i.e., sulfur dioxide and some sulfur trioxide. These gaseous sulfur compounds contaminate the atmosphere and in order to prevent air pollution, such compounds should be separated from the combustion products before release to the atmosphere.

Accordingly, an object of this invention is to provide an effective process for removing undesirable matter from a stack gas.

Another object of this invention is to provide an effective process for removing sulfur compounds from a gas.

A further object of this invention is to provide a process for continuously removing sulfur dioxide and sulfur trioxide from a stack gas.

Still another object of this invention is to provide a more efficient process for removing undesirable sulfur compounds from a stack gas.

These and other objects of this invention will become more fully apparent from the following detailed description of the invention when read with reference to the accompanying drawing which is a schematic flow diagram of an embodiment of the process of the invention.

The objects of this invention are accomplished by providing a process wherein undesirable sulfur compounds are removed from a gas by reaction with a chemical agent which is subsequently regenerated from further use in the process.

More particularly, a gas such as a flue gas containing sulfur dioxide and some sulfur trioxide, is mixed with an alkaline earth metal oxide, preferably calcium oxide, magnesium oxide, or mixtures thereof at a temperature between about 250° F. and about 1000° F., preferably about 600° F. to produce an alkaline earth metal sulfite and some alkaline earth metal sulfate. The amount of oxide to be added may be readily calculated from the amount of sulfur which is present in the fuel producing the flue gas, with best results being obtained when the oxide is present in an amount greater than the stoichiometric amount, preferably at least 1.5 times greater than the stoichiometric amount. The oxide is preferably introduced into the gas as a fine powder to enable an easier entrainment of the oxide in the gas stream and to increase the rate of reaction.

After the oxide has reacted with the sulfur compounds to produce solid sulfites and some sulfates, the solids are separated from the gas and the sulfur free gas is released to the atmosphere. The sulfite is heated to a temperature above the decomposition temperature, preferably to a temperature of at least 1200° F., to produce sulfur dioxide and the corresponding metal oxide. The sulfur dioxide may be used to produce sulfuric acid and the metal oxide is recycled to the opeartion for removing sulfur compounds.

The process of the invention will be described in more detail with reference to the accompanying drawing which illustrates a preferred embodiment for continuously removing sulfur compounds from a gas stream. Although the embodiment illustrated in the drawing is particularly described with reference to removing sulfur compounds from a flue gas with calcined dolomite (calcined dolomite is primarily comprised of magnesium and calcium oxide), it is to be understood that this embodiment is equally applicable to removing sulfur compounds from other gases with compounds other than calcined dolomite. It is also to be understood that equipments such as valves, pumps, fans, etc., have been omitted from the drawing to simplify the description thereof, and the use of such equipments, at appropriate places, is well within the scope of one skilled in the art.

Referring to the drawing, a gas, such as a flue gas from a boiler (not shown), containing sulfur dioxide, traces of sulfur trioxide and fly ash, in line 10 is introduced into a cyclone separator 11 to separate the fly ash therefrom. It is to be understood that other separation equipment, such as hot bag filters, may also be used for removing fly ash from the flue gas. The fly ash is withdrawn from the cyclone separator 11 through line 12 and a relatively fly ash free flue gas is withdrawn through line 13. The flue gas in line 13 is mixed with finely divided, calcined dolomite introduced through line 14 at a temperature and flow rate such that the sulfur dioxide contained therein is converted to calcium and magnesium sulfites, with any sulfur trioxide present being converted to the corresponding sulfates. Thus, line 13 functions as a dilute phase transport reactor for effecting reaction between the undesirable sulfur compounds contained in the flue gas and the calcined dolomite.

The flue gas, containing solid sulfites, some solid sulfates and some remaining fly ash in line 13 is introduced into a cyclone separator 15 to separate the solids and fly ash therefrom. The sulfites, traces of sulfates and remaining fly ash are withdrawn from cyclone separator 15 through line 16 for further treatment, as hereinafter more fully described. Alternatively, these solids may be removed by other separation equipment, such as hot bag filters or Cottrell electric precipitators. The sulfur free flue gas is withdrawn from the cyclone separator 15 through line 17, passed through a waste heat recovery unit, generally indicated as 18, and released to the atmosphere through stack 19.

The solids in line 16 are introduced into a fluid bed reactor generally indicated as 21, containing an upper fluidized bed 22 and a lower fluidized bed 23. The solids in upper fluidized bed 22 are fluidized and heated to above the decomposition temperature of the sulfites by a hot flue gas introduced through line 24 at a temperature above the decomposition temperature of the sulfites to produce sulfur dioxide and regenerate the calcine dolomite.

A gas, containing sulfur dioxide, is withdrawn from the upper fluidized bed 22 through line 25, provided with a cyclone separator 27 to maintain the gas solids free, and passed to a plant for producing sulfuric acid, generally indicated as 26.

Solids, including calcined dolomite, some fly ash and some sulfates, are withdrawn from upper fluidized bed 22 through line 28 and introduced into the lower fluidized bed 23. The solids are cooled in fluidized bed 23 by air introduced through line 29 at a superficial velocity sufficient to effect fluidization thereof. The temperature and flow rate of the air introduced through line 29 is such that calcined dolomite is cooled to the temperature at which mixing with the flue gas in line 13 is to be effected. The cooled calcined dolomite is drawn from the lower fluidized bed 23 through line 14 and mixed with the flue gas in line 13, as hereinabove more fully described. A portion of the solids in line 14 is purged through line 31 to prevent a buildup of inert sulfates and fly ash in the system and makeup calcined dolomite is introduced into line 14 through line 32. It is to be understood that the amount of solids purged through line 31 and accordingly, the amount of calcined dolomite introduced through line 32 as makeup, is dependent on the sulfur trioxide content of the flue gas and the amount of fly ash withdrawn, along with the solids, from the separator 15.

The heated air is withdrawn from the lower fluidized bed 23 through line 33, provided with a suitable cyclone separator 34 to maintain the air therein solid free, and a portion thereof passed to another part of the plant, for example the boiler (not shown), through line 35. The remaining portion of the air in line 33 is mixed with pulverized coal introduced through line 36 and the mixture introduced into a heater, generally indicated as 37. The heat flue gas produced by the burning coal in heater 37 is withdrawn through line 24 and introduced into the upper fluidized bed 22 to effect fluidization and heating of the solids contained therein.

The following example is illustrative of the invention but the scope of the invention is not to be limited thereby.

EXAMPLE

In line 13, 56,600 standard cubic feet per hour (s.c.f.h.) of a flue gas at a temperature of 600° F. are mixed with 50,490 pounds per hour (lb./hr.) of finely divided, calcined dolomite introduced through line 14 at a temperature of 600° F. The mixture in line 13 is introduced into cyclone separator 15 wherein 69,480 lb./hr. of reacted dolomite are separated from the flue gas and withdrawn through line 16 at a temperature of 600° F. The relatively sulfur free (about 90% of the sulfur is removed) flue gas, is withdrawn from cyclone separator 15 through line 17 at a rate of 56,600,000 s.c.f.h.

The solids in line 16 are introduced into upper fluidized bed 22 and are fluidized and heated therein by 174,000 s.c.f.h. of a flue gas introduced through line 24 at a temperature above 3000° F. The heating regenerates the dolomite and 50,490 lbs./hr. of solids, primarily comprised regenerated dolomite, at a temperature of 1600° F. are withdrawn from upper fluidized bed 22 through line 28. A gas 286,500 s.c.f.h., at a temperature of 1600° F., containing about 39% sulfur dioxide, is withdrawn from upper fluidized reactor 22 through line 25. The gas in line 25 is passed to a sulfuric acid plant to produce sulfuric acid.

The solids in line 28 are introduced into lower fluidized bed 23 and are fluidized and cooled therein by 925,000 s.c.f.h. of air introduced through line 29 at a temperature of 60° F. The solids, 50,490 lbs./hr., are withdrawn from lower fluidized bed 23 at a temperature of 600° F. The air, 925,000 s.c.f.h., is withdrawn from lower fluidized bed 23 through 33 at a temperature of 600° F.

A major portion of the air in line 33 is passed to a boiler through line 35 and the remaining portion, 169,000 s.c.f.h. is mixed with 1080 lbs./hr. of pulverized coal at a temperature of 60° F. The mixture is introduced into the heater 37 and 174,000 s.c.f.h. of a flue gas at a temperature above 3000° F. is withdrawn therefrom through line 24 for introduction into the upper fluidized bed 22.

Numerous modifications and variations of the present invention are possible in the light of the above teachings. Therefore, it is to be understood, that within the scope of the appended claims, the invention may be practiced otherwise than as specifically described.

What is claimed is:

1. A process for treating a gas containing sulfur dioxide comprising:
    (a) introducing into the gas finely divided alkaline earth metal oxide selected from the group consisting of calcium oxide, magnesium oxide and mixtures thereof to effect intimate contact between gas and alkaline earth metal oxide at a temperature from about 250° to about 1000° F., whereby the sulfur dioxide reacts with the alkaline earth metal oxide to produce the corresponding sulfite;
    (b) separating solid sulfite from the gas;
    (c) heating the solid sulfite in fluidized form to a temperature above the decomposition temperature thereof to produce sulfur dioxide and the alkaline earth metal oxide;
    (d) cooling the alkaline earth metal oxide to the temperature of step (a); and
    (e) recycling the alkaline earth metal oxide to step (a).

2. The process as defined in claim 1 wherein the cooling of step (d) is effected by contacting the alkaline earth metal oxide in a fluidized state with air and further comprising, recovering the air, burning recovered air to produce a hot combustion gas and contacting the solid sulfite in step (c) with hot combustion gas to effect said heating and decomposition of the sulfite.

3. The process as defined in claim 2 wherein the alkaline earth metal oxide is a mixture of calcium and magnesium oxide as calcined dolomite.

4. The process as defined in claim 3 wherein the gas also contains sulfur trioxide, said sulfur trioxide reacting with the alkaline earth metal oxide in step (a) to produce the corresponding sulfate.

References Cited

UNITED STATES PATENTS

| | | | |
|---|---|---|---|
| 2,829,955 | 4/1958 | Goedkoop | 23—2 X |
| 2,984,545 | 5/1961 | Tarbutton et al. | 23—178 |
| 3,343,908 | 9/1967 | Wickert | 23—2 |

OTHER REFERENCES

Bienstock et al. "Process Developed in Removing $SO_2$ from Hot Flue Gases," Bur. Mines Report #5735 (1961), pp. 9 & 10 relied on.

OSCAR R. VERTIZ, Primary Examiner

G. T. OZAKI, Assistant Examiner

U.S. Cl. X.R.

23—2; 252—475

PO-1050
(5/69)

UNITED STATES PATENT OFFICE
CERTIFICATE OF CORRECTION

Patent No. 3,475,121          Dated October 28, 1969

Inventor(s) JAMES F. THORNTON

It is certified that error appears in the above-identified patent and that said Letters Patent are hereby corrected as shown below:

Column 3, line 27, after The delete "heat" and insert --hot--.

Column 3, line 35, delete "56,600" and insert --56,600,000--.

SIGNED AND
SEALED
FEB 17 1970

(SEAL)
Attest:

Edward M. Fletcher, Jr.
Attesting Officer

WILLIAM E. SCHUYLER, JR.
Commissioner of Patents